United States Patent
Brooking

(10) Patent No.: US 9,203,341 B2
(45) Date of Patent: Dec. 1, 2015

(54) SWITCH ARRANGEMENT

(75) Inventor: Patrick Brooking, Farnham (GB)

(73) Assignee: PROTEAN ELECTRIC LIMITED (GB)

( * ) Notice: Subject to any disclaimer, the term of this patent is extended or adjusted under 35 U.S.C. 154(b) by 62 days.

(21) Appl. No.: 13/982,465

(22) PCT Filed: Jan. 30, 2012

(86) PCT No.: PCT/IB2012/050414
§ 371 (c)(1),
(2), (4) Date: Feb. 6, 2014

(87) PCT Pub. No.: WO2012/101613
PCT Pub. Date: Aug. 2, 2012

(65) Prior Publication Data
US 2014/0159628 A1    Jun. 12, 2014

(30) Foreign Application Priority Data

Jan. 27, 2011    (GB) .................................. 1101431.3

(51) Int. Cl.
*H02H 7/09*    (2006.01)
*H02P 29/02*    (2006.01)
(Continued)

(52) U.S. Cl.
CPC ............ *H02P 29/022* (2013.01); *H02H 7/06* (2013.01); *H02H 7/0833* (2013.01); *H02P 29/021* (2013.01); *H02P 2209/03* (2013.01)

(58) Field of Classification Search
CPC ... B60L 11/1812; B60L 11/02; H02P 29/022; H02H 7/0833

USPC ...................................... 318/400.22, 400.21
See application file for complete search history.

(56) References Cited

U.S. PATENT DOCUMENTS 5,406,186 A    4/1995    Fair
6,297,573 B1    10/2001    Roth-Stielow et al.
(Continued)

FOREIGN PATENT DOCUMENTS

| DE | 102008000145 A1 | 7/2009 |
| EP | 1104080 A2 | 5/2001 |
| GB | 2462940 A | 3/2010 |
| JP | 2009273348 A | 11/2009 |

OTHER PUBLICATIONS

Intellectual Property Office; Combined Search and Examination Report; Mar. 14, 2011; Intellectual Property Office; South Wales.
(Continued)

*Primary Examiner* — Erick Glass
(74) *Attorney, Agent, or Firm* — The Mason Group Patent Specialists LLC; Valerie M. Davis

(57) ABSTRACT

Control apparatus includes an inverter having a plurality of switches arranged to generate a plurality of different voltage phases, and a switch arrangement having a rectifier arranged to be coupled to the respective plurality of coil windings. The rectifier is arranged to rectify an alternating current flowing in respective coil windings and provide the rectified AC current to a DC output, and a switch is coupled across the DC output. The switch is operable to electrically isolate the plurality of coil windings from each other. A controller is arranged to operate the switch to electrically isolate the plurality of coil windings upon a failure of an inverter switch or upon detection of a current flow in the inverter or the switch that is greater than a predetermined threshold.

9 Claims, 4 Drawing Sheets

(51) Int. Cl.
*H02H 7/06* (2006.01)
*H02H 7/08* (2006.01)

(56) References Cited

U.S. PATENT DOCUMENTS

| 8,760,095 B2* | 6/2014 | Iwaji et al. ............... 318/400.26 |
| 2009/0224706 A1* | 9/2009 | Jobard ......................... 318/380 |
| 2010/0262308 A1* | 10/2010 | Anderson et al. ............. 700/287 |

OTHER PUBLICATIONS

WIPO; International Search Report; Mar. 27, 2013; European Patent Office, Rijswijk.
WIPO; Written Opinion of the Internaitonal Searching Authority; Jul. 27, 2013; European Patent Office, Rijswijk.

\* cited by examiner

US 9,203,341 B2

SWITCH ARRANGEMENT

FIELD OF THE DISCLOSURE

The present invention relates to a switch arrangement, in particular a switch arrangement arranged to act as a star point disconnect for an electric motor or generator.

BACKGROUND

Induction and permanent magnet synchronous electric motors operate via the production of a rotating magnetic field, which is typically formed via current flowing through coil windings mounted on a stator. The coil windings typically form a group of phase windings distributed around the stator that are coupled together. For a three phase electric motor or generator three sets of phase windings are connected together in either a star or delta configuration.

For example, a six phase electric motor or generator having six sets of phase windings connected in a star configuration is illustrated in FIG. 1, where one end of each of the windings are connected at a common point, known as a star point 100.

During operation of the electric motor or generator a different voltage phase is applied or generated across each group of phase windings. Accordingly, for an n-phase electric motor or generator an n-phase voltage is applied across the respective phase windings of the electric motor or generator.

An inverter, which includes a plurality of switches, is commonly used to operate an n-phase electric motor or generator where only a DC voltage supply is available. FIG. 2 illustrates a typical three phase inverter 200 having six switches Q1 to Q6 with associated anti-parallel diodes D1 to D6 coupled to a three phase electric motor 210. The inverter switches are typically controlled via pulse width modulation or space vector control to produce a fundamental AC output voltage of much lower frequency than the switching frequency of the respective inverter switches. The control system used for operating the inverter switches is commonly based on a microprocessor but can also be implemented by other devices, for example dedicated integrated circuits (ICs), programmable logic ICs, analog and digital signal processing circuitry, or a combination of these devices.

However, if a fault should occur in one or more of the inverter switches that results in a short circuit occurring, electric currents can circulate through the coil windings of the electric motor or generator, the failed switch and the anti-parallel diodes associated with some of the other switches. This is despite all the remaining operating inverter switches being switched off (i.e. open circuit or non-conducting).

An example of a short circuit condition is illustrated in FIG. 3, where a short circuit occurs in one of the inverter switches Q5 in a leg of a three phase inverter 300 having six switches. As illustrated in FIG. 3, even if all the remaining switches Q1-4 and Q6 are switched off, circulating currents still occur through switch Q5, D1 & D3, where D1 and D3 are anti-parallel diodes associated with switches Q1 and Q3 respectively.

As a result of the unwanted circulating currents being determined by the internally generated EMFs of the electric motor/generator 210, and being limited only by the circuit impedances of the electric motor/generator and associated inverter, the unwanted currents can be of abnormally high magnitude. Consequently, the circulating currents can result in high torques being produced by the electric motor/generator. This is particularly so in an electric motor/generator that does not have controlled excitation, for example permanent magnet machines or synchronous machines with self excitation of the rotor.

The following are examples of scenarios where inverter switch failures, which result in unwanted circulating currents, can have undesirable operational consequences.

In a drive system in which an electric motor/generator can be driven by other energy or power sources, for example an electric motor/generator in an electric vehicle or wind turbine, circulating currents can result in the overheating of the coil windings, and ultimately failure of the electric motor/generator through burn out of the coil windings.

In an electric vehicle having a single electric motor acting as a traction motor, unwanted circulating currents can result in a high braking torque being generated by the traction motor. This braking torque can cause the vehicle to decelerate rapidly without warning. In a vehicle having multiple independent drive motors, for example in-wheel motors, failure of an inverter for one wheel motor can result in a braking torque being applied to that wheel, which could result in directional deviation of the vehicle.

It is desirable to improve this situation.

SUMMARY

In accordance with an aspect of the present invention there is provided a switch arrangement according to the accompanying claims.

This provides the advantage of allowing a single switch to be used to cause an open circuit condition to occur at a star point connection of the coil windings of an electric motor/generator, thereby preventing circulating currents to occur upon an inverter switch short circuit failure.

By rectifying the AC currents flowing into the star point connection of the motor/generator phase windings, a single switch can be used to interrupt electric currents in the coil windings of an electric motor/generator very quickly, thereby removing all torque produced by the electrical machine.

BRIEF DESCRIPTION OF THE FIGURES

The present invention will now be described by way of example, with reference to the accompanying drawings, in which.

DETAILED DESCRIPTION

For the purposes of the present embodiment, reference to electric motor is also intended to include a reference to an electric generator.

An electric motor that has star connected phase windings normally features a permanent connection of the end of the windings to form what is commonly known as a star point connection. This connection is typically formed either internally inside the electric motor or at a junction box situated on the outside of the electric motor.

The embodiment of the switch arrangement described below enables this star point connection of the phase windings to be made by means of a single switch and disconnected by means of the same single switch.

Figure 4:
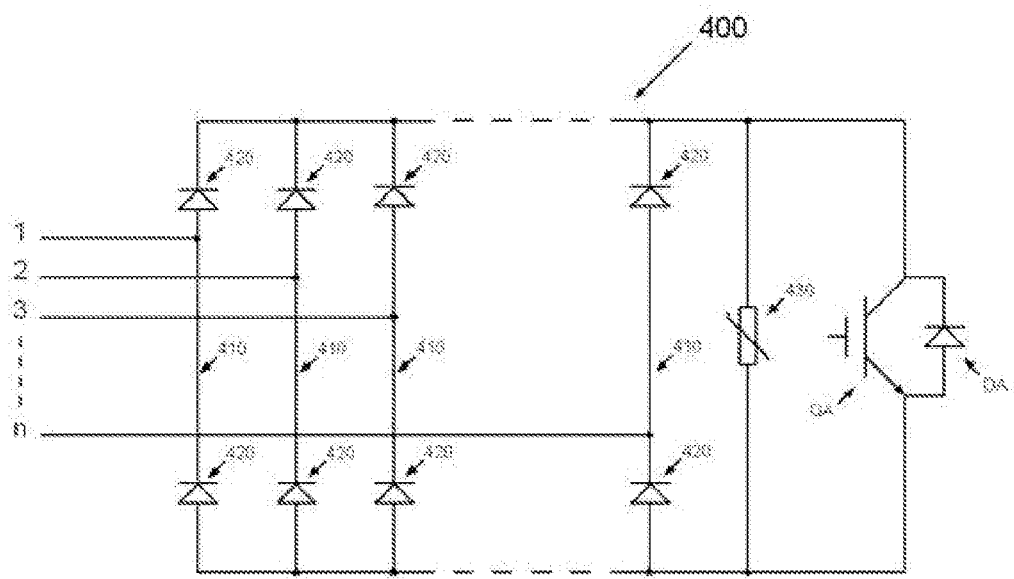
FIG. 4 illustrates a switch arrangement according to an embodiment of the present invention.
Figure 5:
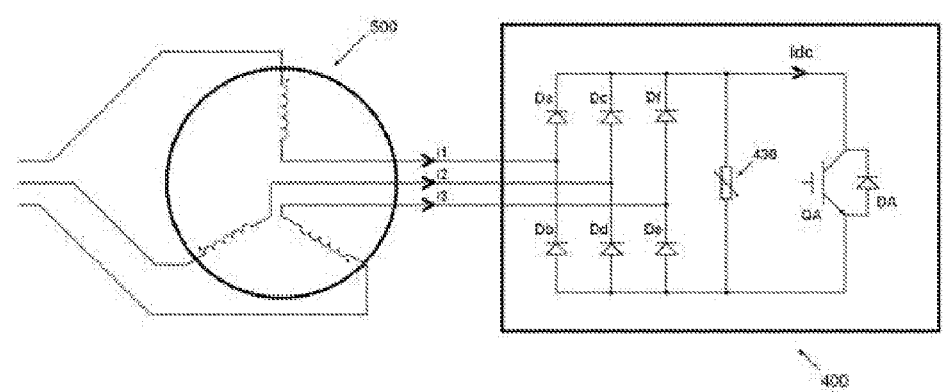
FIG. 5 illustrates a switch arrangement according to an embodiment of the present invention coupled to a three phase electric motor or generator.

FIG. 4 illustrates a switch arrangement 400 in accordance with an embodiment of the present invention. The switch arrangement 400 is configured as a single switch star point disconnect circuit for an n phase electric motor. The electric motor can be driven by any AC source, including an inverter. The switch arrangement comprises an n phase bridge rectifier having n diode legs 410 with two diodes 420 incorporated within each leg to provide 2n diodes in total in the bridge rectifier. Each phase winding of an n phase electric motor is connected to a respective leg of the rectifier, as illustrated in FIG. 5, where n is equal to 3 and Da-Df are the bridge rectifier diodes.

Connected across the dc output of the n phase bridge rectifier is connected a switch QA. Preferably, the switch is a semiconductor switch, for example an IGBT or a MOSFET device. However, other forms of switches capable of carrying and breaking DC current can be used, for example a mechanical switch. For the purposes of the present embodiment the switch QA is an IGBT switch. Preferably, the semiconductor switch includes an anti-parallel diode DA to protect the IGBT switch against negative voltage transients that could occur at high speed in the star point disconnect circuit.

The switch QA is switchable between an open circuit or off state and closed circuit or on state. In the closed circuit state the switch is arranged to have a low resistance, thereby resulting in the voltage drop across the switch being comparatively low and allowing current to flow through the switch relatively unimpeded. In the open circuit state the switch is arranged to provide electrical isolation across the switch. Typically, in the open circuit position the switch has an effective resistance greater than 100 k ohms. However, in the open circuit state the switch can have any resistance that results in effectively providing electrical isolation across the switch QA.

Preferably a voltage clamping device 430, for example a varistor, a zener diode, a capacitor, a snubber circuit, or a combination of these, is also connected across the rectifier DC output in parallel with the switch QA. The purpose of the voltage clamping device 430 is to absorb energy in the motor coil windings when the currents are interrupted by operation of the star point disconnect (i.e. the switch arrangement); to clamp the switch QA voltage to a maximum value when the switch QA is turned off to prevent the switch voltage rising to a value greater than it's rated value; to clamp the voltage across the switch QA to a higher value than the DC bus voltage of the inverter to force the phase currents to zero. Alternatively, the semiconductor switch can be actively controlled to limit the clamping voltage to a level above the inverter DC bus voltage.

As the switch arrangement bridge rectifier is used to allow only a DC current to pass through switch QA, this enables a single switch to be used to isolate current flow in the electric motor should a fault in the electric motor occur.

Preferably the switch QA is a solid state device, which is typically faster and more reliable than using relays, contactors or circuit breakers to open the star point of an electric motor. Switch QA is in continuous conduction in normal operation of the machine, so it has no switching losses.

The operation of the switch arrangement 400 will now be described.

To create an electrical star point for coil windings of a three phase electric motor 500 as illustrated in FIG. 5, where the coil windings have been connected to the rectifier as described above, the switch QA is closed to create a short circuit across the DC output of the rectifier. This results in the coil windings being electrically coupled in a star configuration. Resultant three phase AC current that passes through the coil windings is rectified by the rectifier with the rectified AC current (i.e. DC current) passing through switch QA.

As the voltage drop across the switch arrangement 400 is comparatively low compared to the system voltages, this has little influence on the operation of the electric motor 500.

Figure 1:
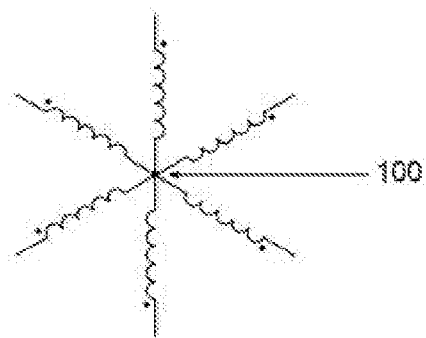
FIG. 1 illustrates a star connection for coil windings of a six phase electric motor or generator.
Figure 2:
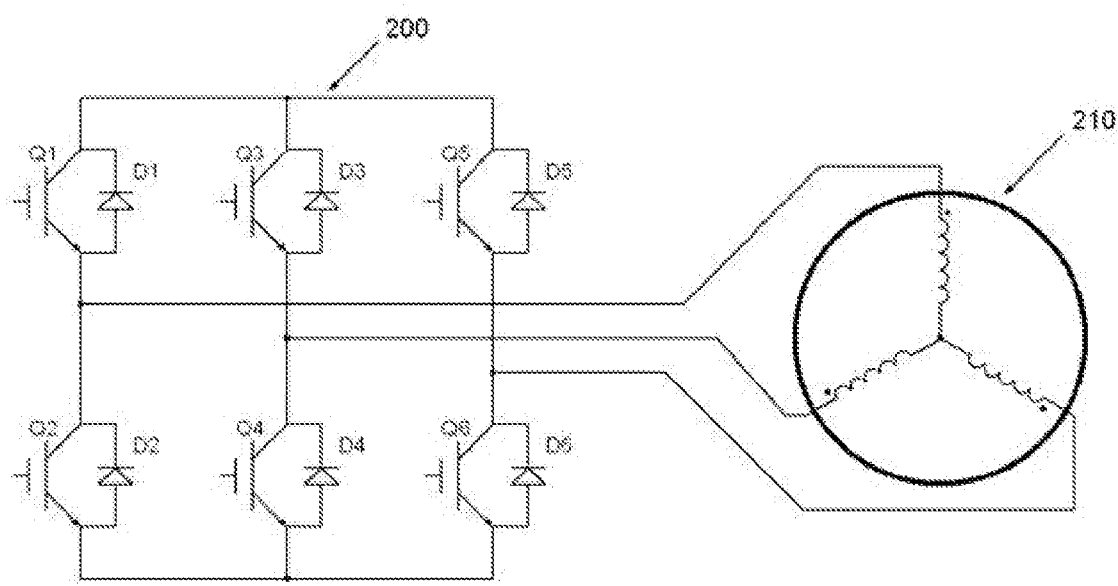
FIG. 2 illustrates an inverter coupled to a three phase electric motor or generator.
Figure 3:
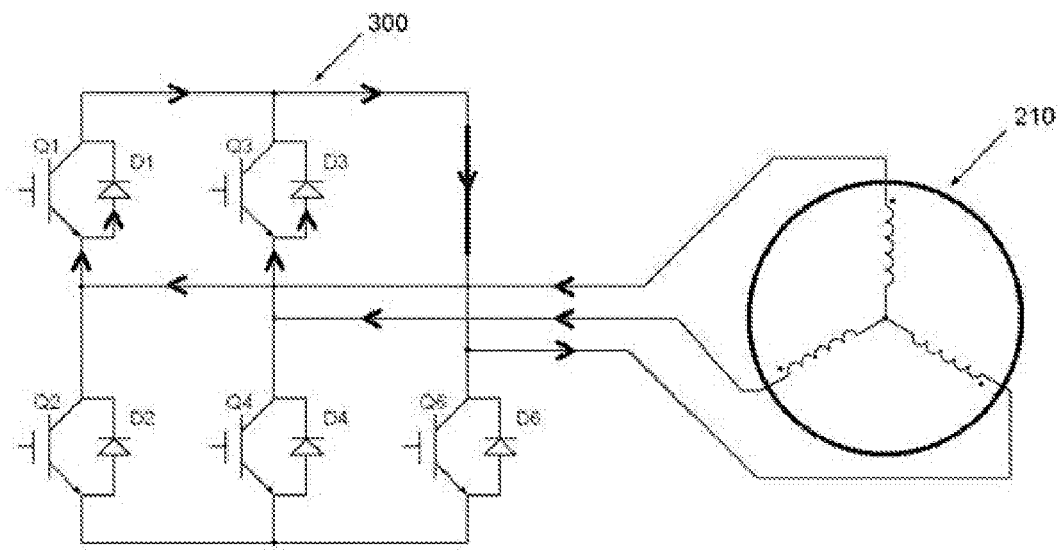
FIG. 3 illustrates an inverter with a short circuit condition coupled to a three phase electric motor or generator.

In a configuration where an electric motor is provided with AC voltage via an inverter, for example as illustrated in FIG. 2, and a short circuit occurs in one of the inverter switches, a controller is arranged to switch the switch QA to an off state (i.e. the switch QA is made to go open circuit), which has the effect of opening the star point connection of the phase windings and interrupting the current flow through the electric motor coil windings.

While the short circuit condition continues the switch QA can remain open or off state.

Where a voltage clamping device 430 is connected across the DC output of the rectifier in parallel with switch QA, when switch QA is turned off the voltage across the switch QA will rise to that of the level defined by the voltage clamping device 430.

Preferably, the voltage clamping device 430 will have a clamping voltage higher than the DC bus voltage of the inverter. Once the switch QA has been opened the energy in the electric motor coil windings is absorbed by the voltage clamping device 430 and the electric motor phase currents are forced to ramp down to zero. Using a varistor as a voltage clamping device will typically result in the switch arrangement 400 being capable of turning off the electric motor phase currents in less than 100 microseconds.

Figure 6:
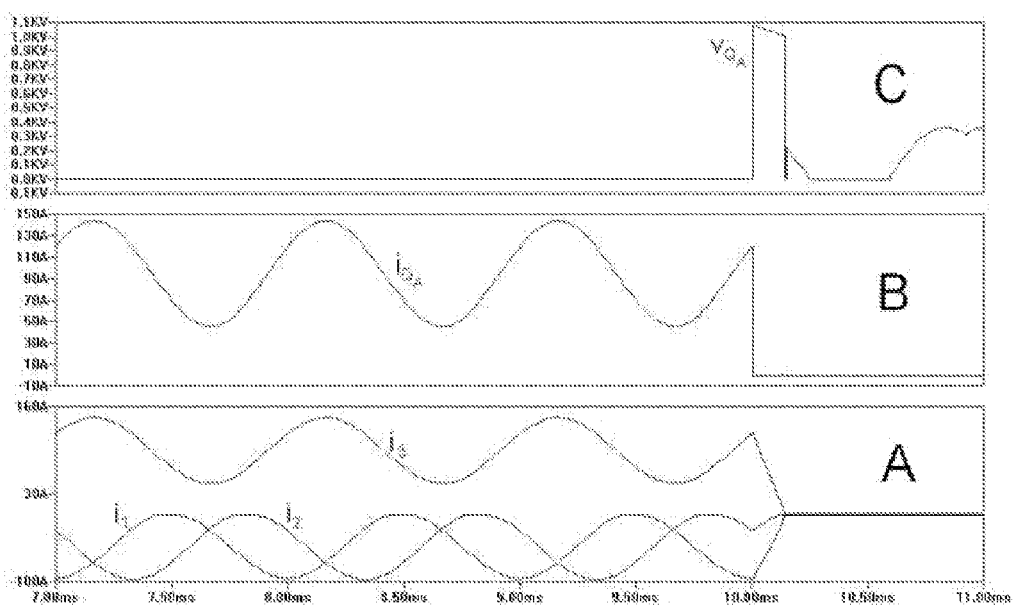
FIG. 6 illustrates current and voltage profiles associated with a switch arrangement according to an embodiment of the present invention.

FIG. 6 illustrates examples of current and voltage profiles for a three phase electric motor coupled to a switch arrangement 400, where the switch arrangement 400 is in accordance with an embodiment of the present invention. The current and voltage profiles in FIG. 6 illustrate an example where switch QA is made to go open circuit at time 10.00 ms upon a short circuit condition occurring previously in a switch of the inverter.

Profile A corresponds to the current flow in the coil windings of the three phase electric motor, profile B corresponds to the rectified DC current, profile C corresponds to the voltage across switch QA.

Although the present embodiment illustrates a switch arrangement 400 coupled to a three phase electric motor 500 as stated above, the switch arrangement can be designed to be connected to an n-phase electric motor, where n is any value greater than two.

For an n-phase electric motor having n sets of coil windings, each respective set of phase winding is coupled to a respective rectifier leg, as illustrated in FIG. 4 or 5. As with the above embodiment, a single switch is coupled across the DC output of the rectifier.

Figure 7:
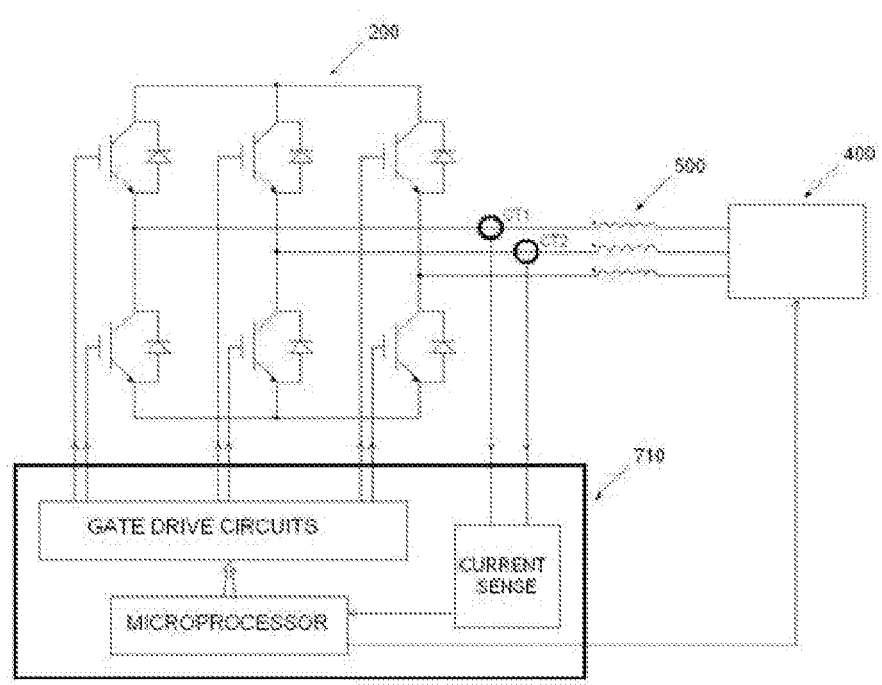
FIG. 7 illustrates a control system according to an embodiment of the present invention coupled to a three phase electric motor or generator.

FIG. 7 illustrates a control apparatus in accordance with an embodiment of the present invention, where the operation of the switch arrangement 400 and an inverter 300 are controlled by a control system 710, where the control apparatus includes the control system 710, the inverter 300 and the switch arrangement 400.

For example, as part of a normal inverter shutdown or if an inverter switch failure is identified, the control system 710 can be arranged to switch off switch QA (i.e. make switch QA go open circuit/non-conducting) at the same time as the main inverter switches are turned off. This obviates the need for sensing the circulating currents resulting from an inverter switch short circuit.

Alternatively, the control system 710 can be arranged to switch off switch QA upon the detection of currents circulating in the coil windings after the inverter 700 has been switched off, or when currents of a magnitude greater than normally expected are detected. These currents can be detected by current transformers, or current sensing resistors, or device voltage drops in either the inverter or the single switch star point disconnect.

The switch arrangement 400 can also be activated by sensing the temperature of the coil windings of the electric motor, and turning off switch QA if the winding temperatures are outside normal operating parameters.

The switch arrangement 400 can also be activated by determining the torque generated by the electric motor, and turning off switch QA if the generated torque is outside normal operating parameters.

Preferably the control system 710 is powered from an auxiliary power supply that also powers a control or drive circuit to the switch QA such that removal of the auxiliary supply will shut down switch QA and open circuit the star point connection of the electric motor coil windings. This represents a failsafe mode of operation as if the inverter control system 710 is powered down, the star point will be effectively open, so no electric currents can flow in the electric motor 500.

Turning off switch QA will prevent energy being removed from the system, either into or via the DC bus coupled to the inverter 300, and hence because there will be no current in the coil windings the electric motor 500 will coast without applying any counter-torque. This is an inherent safety feature of using a star point disconnect as in the event of inverter shutdown or inverter failure, none of the kinetic energy of the motor or drive system to which it is connected can be removed via currents in the windings which would otherwise cause a braking torque.

The control system 710, the inverter 300 and the switch arrangement 400 can be located inside an electric motor, which would obviate the need to take the electric motor coil windings outside of the electric motor 500.

Figure 8:
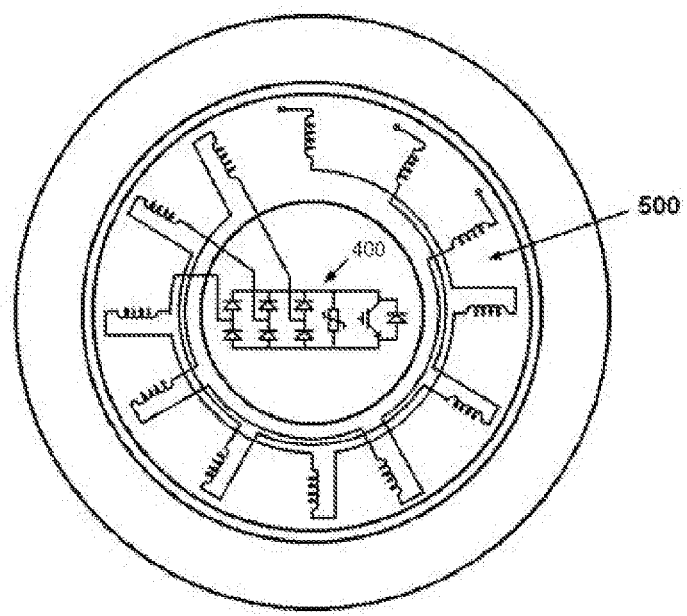
FIG. 8 illustrates an in-wheel electric motor having a switch arrangement according to an embodiment of the present invention.

Alternatively, the electric motor may include just the switch arrangement 400 with its own control system, with the inverter 300 being mounted externally to the electric motor 500 with its own separate control system. For example, FIG. 8 illustrates an in-wheel electric motor that includes a switch arrangement 400 connected to the phase windings. The control system can be made autonomous in operation, and optionally receive its power supply from the electric motor 500.

Where an electric motor has a plurality of sub motors, with the voltage to each sub motor being controlled via its own inverter 300, a separate switch arrangement 400 can be associated with a respective inverter 300.

The switch arrangement 400 can be powered by any suitable power source, for example a mains voltage source, a local power supply and/or from the electric motor itself.

The use of the switch arrangement 400 as described above can be used to prevent a voltage being present on the DC bus of the inverter 300 connected as the drive to an electric motor 500, such as would occur when the electric motor generates a back EMF and the inverter is turned off.

By allowing the switch arrangement 400 to inhibit unwanted current flows around the coil windings this allows the prevention of unwanted torque.

The switch arrangement 400 allows for the safe shutdown of an electric motor.

Preferably the switch arrangement 400 is arranged to go open circuit upon the removal of power. As such, if no power is applied to the system that controls the switch arrangement 400 the switch goes open circuit; that is to say, the switch is turned off with no power applied.

The invention claimed is:

1. A control apparatus for controlling an electric motor or generator having a plurality of coil windings that during operation of the electric motor or generator are electrically coupled to form a star point connection and that are arranged to have different voltage phases applied across the respective coil windings, the control apparatus comprising an inverter having a plurality of switches arranged to generate the plurality of different voltage phases, a switch arrangement comprising a rectifier arranged to be coupled to the respective plurality of coil windings, wherein the rectifier is arranged to rectify an alternating current flowing in the respective coil windings and provide the rectified AC current to a DC output; and a switch coupled across the DC output, wherein the switch is operable to electrically isolate the plurality of coil windings from each other, and a controller arranged to operate the switch to electrically isolate the plurality of coil windings upon a failure of an inverter switch or upon detection of a current flow in the inverter or the switch that is greater than a predetermined threshold.

2. A control apparatus according to claim 1, wherein the switch arrangement further comprises a voltage clamping device coupled across the DC output in parallel with the switch.

3. A control apparatus according to claim 2, wherein the voltage clamping device is a varistor, a zener diode, a capacitor, a snubber circuit or an actively controlled device.

4. A control apparatus according to claim 2, wherein the voltage clamping device has a clamping voltage greater than a DC bus voltage coupled to the inverter.

5. A control apparatus according to claim 1 further comprising means to determine current flow in the plurality of coil windings and/or a temperature within the electric motor or generator and/or torque generated by the electric motor or generator, and a failure of an inverter switch is identified based on predetermined current and/or temperature and/or torque value.

6. A control apparatus according to claim 1, wherein the controller is arranged to operate the switch to electrically isolate the plurality of coil windings if no AC voltage is generated by the inverter.

7. A control apparatus according to claim 1, wherein the inverter and switch arrangement are formed on the same power module for operating an electric motor or generator.

8. An electric motor or generator comprising a control apparatus according to claim 1.

9. An electric motor or generator according to claim 8, having a plurality of sub motors, wherein each sub motor has a plurality of coil windings that during operation of the electric motor or generator are electrically coupled to form a star point connection and that are arranged to have different voltage phases applied across the respective coil windings, wherein each sub motor has a control apparatus according to claim 4 coupled to the respective sub motor to control operation of the respective sub motor.

* * * * *